United States Patent
Ono

(10) Patent No.: US 9,769,339 B2
(45) Date of Patent: Sep. 19, 2017

(54) IMAGE FORMING APPARATUS AND IMAGE FORMING METHOD

(71) Applicant: Zentaroh Ono, Tokyo (JP)

(72) Inventor: Zentaroh Ono, Tokyo (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 15/159,915

(22) Filed: May 20, 2016

(65) Prior Publication Data

US 2016/0366293 A1  Dec. 15, 2016

(30) Foreign Application Priority Data

Jun. 9, 2015 (JP) ................................. 2015-116955

(51) Int. Cl.
*H04N 1/04* (2006.01)
*H04N 1/00* (2006.01)

(52) U.S. Cl.
CPC ..... *H04N 1/00474* (2013.01); *H04N 1/00413* (2013.01); *H04N 1/00482* (2013.01); *H04N 2201/0094* (2013.01)

(58) Field of Classification Search
CPC ............ G06F 3/04842; H04N 21/8543; H04N 21/8547; H04N 5/23216; H04N 5/23293; H04N 21/21805; H04N 21/233; H04N 21/242; H04N 21/2665; H04N 21/2743; H04N 21/41407; H04N 21/42203; H04N 21/4223
USPC ................ 709/204, 248, 223, 245; 713/176; 715/738, 802; 358/1.13, 1.12, 1.14, 1.15, 358/1.9, 906, 909.1
See application file for complete search history.

(56) References Cited

U.S. PATENT DOCUMENTS

| | | | | |
|---|---|---|---|---|
| 5,828,866 A | * | 10/1998 | Hao | ...................... H04M 3/567 703/7 |
| 6,738,424 B1 | * | 5/2004 | Allmen | ................... G06T 9/001 375/240.08 |
| 9,235,793 B2 | * | 1/2016 | Tsukahara | .......... G03G 15/5004 |
| 9,244,640 B2 | * | 1/2016 | Nakashima | ........... G06F 3/1236 |

(Continued)

FOREIGN PATENT DOCUMENTS

JP  2013-186748  9/2013

*Primary Examiner* — Negussie Worku

(74) *Attorney, Agent, or Firm* — Harness, Dickey & Pierce, P.L.C.

(57) ABSTRACT

An image forming apparatus includes: an operation unit that includes a display unit where a screen is displayed and a first operating system, and accepts an operation; and a main body unit that includes a second operating system, and acts according to an operation accepted by the operation unit, wherein the operation unit includes: an operation accepting unit that accepts, when an always-displayed screen for using a specific function is pressed, activation of a first application running on the first operating system to use the specific function associated with the screen; a synchronization processing unit that performs synchronization between a second application running on the first operating system and a third application running on the second operating system; an app-activation control unit that activates the first application after performing the synchronization; and a display control unit that displays an operation accepting screen of the first application on the display unit.

17 Claims, 12 Drawing Sheets

(56) References Cited

U.S. PATENT DOCUMENTS

| | | | |
|---|---|---|---|
| 9,338,320 B2* | 5/2016 | Haga | H04N 1/00904 |
| 9,575,702 B2* | 2/2017 | Suzuki | G06F 3/1208 |
| 2007/0005682 A1* | 1/2007 | Ishibashi | G06F 9/541 |
| | | | 709/202 |
| 2008/0201555 A1* | 8/2008 | Ooshio | H04N 1/00384 |
| | | | 712/29 |
| 2009/0315847 A1* | 12/2009 | Fujii | G06F 3/04883 |
| | | | 345/173 |
| 2011/0045868 A1* | 2/2011 | Sheha | H04M 1/274583 |
| | | | 455/556.1 |
| 2012/0314257 A1* | 12/2012 | Osada | G03G 15/5016 |
| | | | 358/1.15 |
| 2014/0078549 A1* | 3/2014 | Amiya | H04N 1/00233 |
| | | | 358/1.15 |
| 2014/0082609 A1 | 3/2014 | Ono | |
| 2014/0250444 A1 | 9/2014 | Ono | |
| 2014/0304604 A1* | 10/2014 | Miyazawa | G06F 3/167 |
| | | | 715/727 |
| 2015/0043026 A1 | 2/2015 | Soyama et al. | |
| 2015/0278982 A1* | 10/2015 | Ono | G06T 1/20 |
| | | | 345/522 |
| 2016/0352948 A1* | 12/2016 | Ono | H04N 1/00891 |

* cited by examiner

FIG.4

| APP OF OPERATION UNIT | APP OF MAIN BODY UNIT |
|---|---|
| COPY | COPY |
| SCANNER | SCANNER |
| FAX | FAX |
| BROWSER | HOME |
| HOME | HOME |

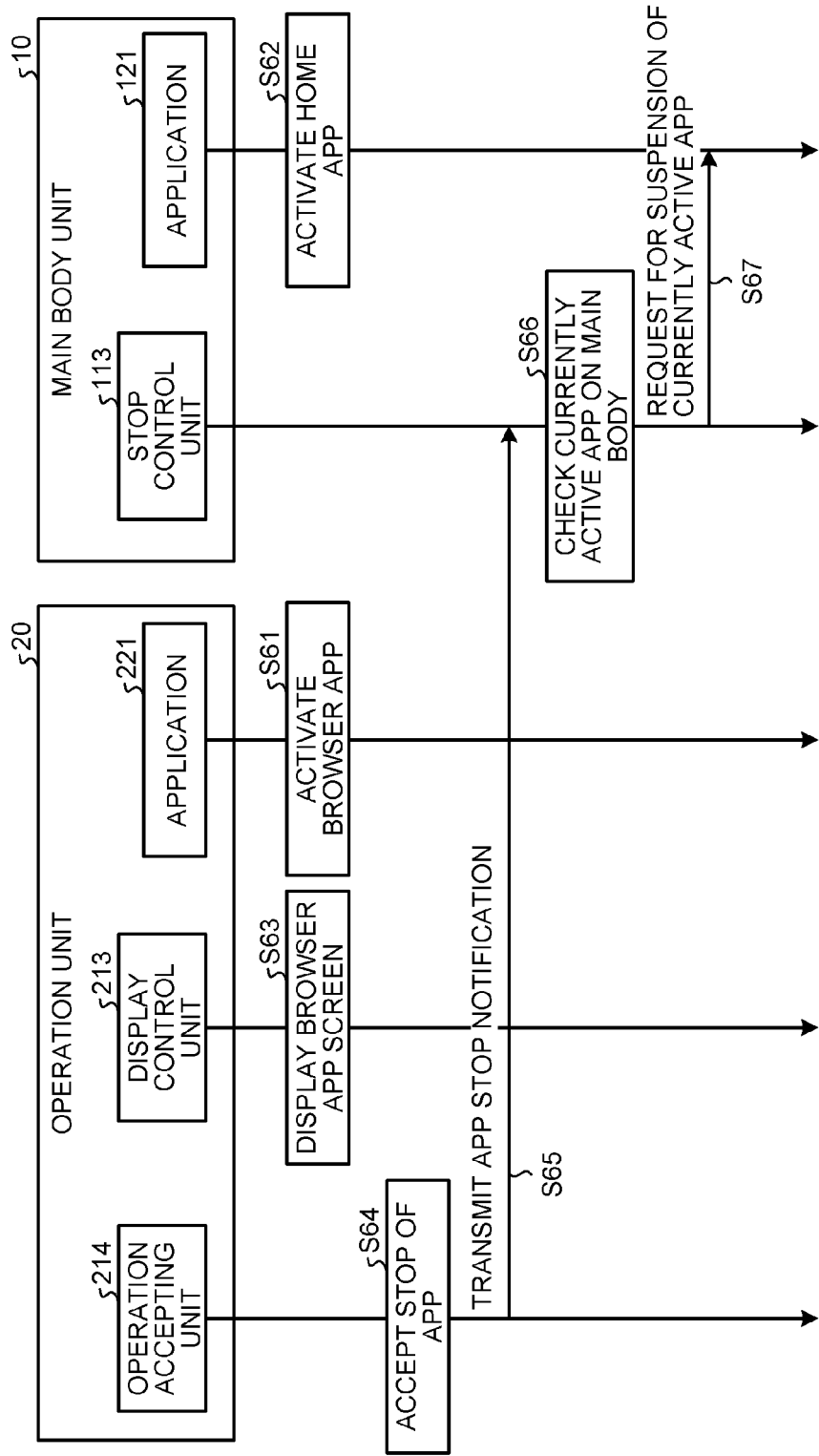

IMAGE FORMING APPARATUS AND IMAGE FORMING METHOD

CROSS-REFERENCE TO RELATED APPLICATIONS

The present application claims priority under 35 U.S.C. §119 to Japanese Patent Application No. 2015-116955 filed in Japan on Jun. 9, 2015. The contents of which are incorporated herein by reference in their entirety.

BACKGROUND OF THE INVENTION

1. Field of the Invention

The present invention relates to an image forming apparatus and an image forming method.

2. Description of the Related Art

At the present day, there is an image forming apparatus that includes an operation unit to which various applications can be added by installing an operating system (OS) on the operation unit. Hereinafter, an application is also referred to as an "app".

Furthermore, there is an image forming apparatus that includes an operation unit through which an application can be activated by pressing of an icon of the application on its home screen that displays thereon icons to select any application.

On the other hand, there is a conventional image forming apparatus that includes an operation unit through which a different application from a currently-displayed application can be directly activated by pressing of a hardware key to select the application without going through a home screen. Then, the conventional image forming apparatus can stop processing a job of the currently-displayed application by pressing of a STOP key, which is one of hardware keys of the operation unit.

For example, in Japanese Laid-open Patent Publication No. 2013-186748, there is disclosed a job processing system capable of registering a job accepted thereby having the processing of the job waiting until the preceding job has been processed. When a STOP key has been pressed, the job processing system disclosed in Japanese Laid-open Patent Publication No. 2013-186748 suspends the registration of an unregistered job, which has not yet been registered in a job list, even if it is an accepted job; therefore, it is possible to reliably stop the processing of a job to be stopped.

It is troublesome to activate an application through a home screen of an operation unit, which is an initial screen to call an operation accepting screen (a UI screen) for using multiple functions. However, if hardware function keys are retained in the operation unit just like the conventional image forming apparatus, there is a problem that the screen area becomes smaller.

Accordingly, function keys (software keys) may as well be displayed in an always-displayed banner area of even an operation unit equipped with an OS, so a different application from a currently-displayed application can be directly activated by pressing of a corresponding function key without going through a home screen. The function keys here mean software keys always displayed in the banner area of the operation unit.

Furthermore, the operation unit is equipped with the OS; therefore, besides applications that use functions of a main body unit, an application that does not use a function of the main body unit can be added to the operation unit. Accordingly, when an application that uses a function of the main body unit and an application that does not use a function of the main body unit have been activated on the operation unit, there is a problem that even if a STOP key, which is one of the function keys in the banner area, is pressed to stop a currently-displayed application on the operation unit, a stop screen to stop the processing of a job of the currently-displayed application is not displayed properly. That is, although a user presses the STOP key with the intention of stopping the job of the currently-displayed application on the screen of the operation unit, the STOP key performs a process of stopping a job of a currently active application on the main body unit; therefore, it is necessary to synchronize the currently-displayed application on the operation unit and the currently active application on the main body unit.

Furthermore, when the STOP key has been pressed, the job processing system disclosed in Japanese Laid-open Patent Publication No. 2013-186748 stops the processing of even a job that has been accepted but not yet been registered in the job list; however, the job processing system has not solved the problem that the stop screen to stop the processing of a job of a currently-displayed application is not displayed on the operation unit properly.

In view of the above, there is a need to provide an image forming apparatus and image forming method capable of synchronizing an application displayed on an operation unit and a currently active application on a main body unit.

SUMMARY OF THE INVENTION

It is an object of the present invention to at least partially solve the problems in the conventional technology.

According to exemplary embodiments of the present invention, there is provided an image forming apparatus comprising: an operation unit that is equipped with a display unit on which a screen is displayed and a first operating system, and accepts an operation; and a main body unit that is equipped with a second operating system, and acts according to an operation accepted by the operation unit, wherein the operation unit includes: an operation accepting unit that accepts, when an always-displayed screen for using a specific function has been pressed, activation of a first application running on the first operating system to use the specific function associated with the screen; a synchronization processing unit that performs a synchronization process of synchronizing a second application running on the first operating system and a third application running on the second operating system; an app-activation control unit that activates the first application after the synchronization processing unit has performed the synchronization process; and a display control unit that performs control of displaying an operation accepting screen of the first application activated by the app-activation control unit on the display unit.

Exemplary embodiments of the present invention also provide an image forming apparatus comprising: an operation unit that is equipped with a display unit on which a screen is displayed and a first operating system, and accepts an operation; and a main body unit that is equipped with a second operating system, and acts according to an operation accepted by the operation unit and, when notified of the stop of an application accepted by the operation unit, controls a process of checking a currently active application on the second operating system and stopping a job of the application, wherein the operation unit includes: an operation accepting unit that accepts, when an always-displayed screen for using a specific function has been pressed, activation of a first application running on the first operating system to use the specific function associated with the screen; a synchronization processing unit that performs a synchronization process of synchronizing a second application running on the first operating system and a third application running on the second operating system; an app-activation control unit that activates the first application after the synchronization processing unit has performed the synchronization process; and a display control unit that performs control of displaying an operation accepting screen of the first application activated by the app-activation control unit on the display unit.

Exemplary embodiments of the present invention also provide an image forming method implemented by an image forming apparatus that includes an operation unit, which is equipped with a display unit on which a screen is displayed and a first operating system and accepts an operation, and a main body unit, which is equipped with a second operating system and acts according to an operation accepted by the operation unit, the image forming method comprising: accepting, when an always-displayed screen for using a specific function has been pressed, activation of a first application running on the first operating system to use the specific function associated with the screen; performing a synchronization process of synchronizing a second application running on the first operating system and a third application running on the second operating system; activating the first application after the synchronization process has been performed; and performing control of displaying an operation accepting screen of the activated first application on the display unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram illustrating an example of stored-app correspondence information;

FIG. 12 is a diagram illustrating another example of the processing operation of the MFP when accepted the stop of an app.

DETAILED DESCRIPTION OF THE PREFERRED EMBODIMENTS

An exemplary embodiment of an image forming apparatus and image forming method according to the present invention is described in detail below with reference to accompanying drawings. In the following description, there is described an example in which the image forming apparatus according to the present invention is applied to a multifunction peripheral (MFP); however, the image forming apparatus according to the present invention is not limited to this. Incidentally, the MFP is a device having at least any two of the following functions: copy function, scanner function, facsimile (fax) function, and printer function.

Figure 1:
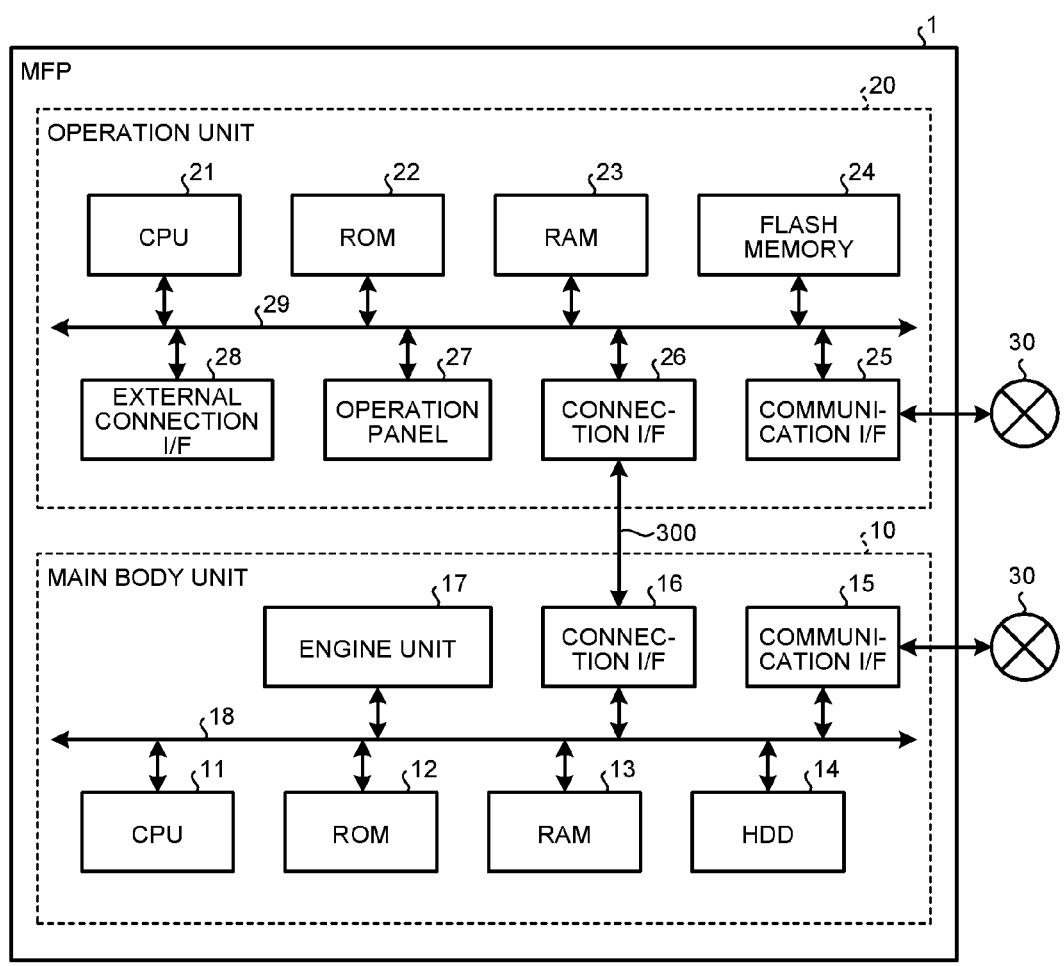
FIG. 1 is a diagram showing an example of a hardware configuration of an MFP according to an embodiment of the present invention.

FIG. 1 is a diagram showing an example of a hardware configuration of an MFP 1 according to the present embodiment. As shown in FIG. 1, the MFP 1 includes a main body unit 10 and an operation unit 20; the main body unit 10 can realize various functions such as copy function, scanner function, fax function, and printer function, and the operation unit 20 accepts an input according to a user's operation. Incidentally, the operation unit 20 includes a display unit that displays thereon a screen, and accepts a user's operation. Then, the main body unit 10 acts according to an operation accepted by the operation unit 20. Incidentally, accepting a user's operation is a general idea that includes accepting information (including a signal or the like that indicates a screen coordinate value) input according to a user's operation. The main body unit 10 and the operation unit 20 are connected via a dedicated communication path 300 so that they can communicate with each other. As the communication path 300, for example, one based on the universal serial bus (USB) standard can be used, or any other standard-based one can also be used regardless of whether wired or wireless.

Incidentally, the main body unit 10 can act according to an operation accepted by the operation unit 20. Furthermore, the main body unit 10 can communicate with an external device such as a client personal computer (PC) as well, and can also act according to an instruction received from the external device.

First, a hardware configuration of the main body unit 10 is explained. As shown in FIG. 1, the main body unit 10 includes a CPU 11, a ROM 12, a RAM 13, a hard disk drive (HDD) 14, a communication interface (I/F) 15, a connection I/F 16, and an engine unit 17; these components are connected to one another via a system bus 18.

The CPU 11 controls the operation of the main body unit 10 overall. The CPU 11 executes a program stored in storage, such as the ROM 12 or the HDD 14, using the RAM 13 as a work area, thereby controlling the operation of the entire main body unit 10 and realizing various functions such as the above-mentioned copy function, scanner function, fax function, and printer function.

The communication I/F 15 is an interface for connecting to a network 30. Furthermore, the communication I/F 15 is connected to the network 30 so that the main body unit 10 can receive print data from an external device such as a PC.

The connection I/F 16 is an interface for communicating with the operation unit 20 via the communication path 300.

The engine unit 17 is a printer engine or the like that can be connected to the system bus 18. For example, the printer engine is a unit that performs print processing, and includes, for example, a black-and-white plotter, a 1-drum color plotter, a 4-drum color plotter, etc., and can further include a scanner unit, a fax unit, etc. Incidentally, the engine unit 17 includes an image processing part, which performs error diffusion, gamma conversion, etc., in addition to a so-called engine part such as a plotter.

Next, a hardware configuration of the operation unit 20 is explained. As shown in FIG. 1, the operation unit 20 includes a CPU 21, a ROM 22, a RAM 23, a flash memory 24, a communication I/F 25, a connection I/F 26, an operation panel 27, and an external connection I/F 28; these components are connected to one another via a system bus 29.

The CPU 21 controls the operation of the operation unit 20 overall. The CPU 21 executes a program stored in storage, such as the ROM 22 or the flash memory 24, using the RAM 23 as a work area, thereby controlling the operation of the entire operation unit 20 and realizing various functions to be described later, such as display of information (an image) according to an input accepted from a user.

The communication I/F 25 is an interface for connecting to the network 30. The connection I/F 26 is an interface for communicating with the main body unit 10 via the communication path 300.

The operation panel 27 accepts various inputs according to user's operations, and displays thereon a variety of information (for example, information according to an input accepted, information that indicates the operating status of the MFP 1, information that indicates the settings, etc.). In this example, the operation panel 27 is composed of a liquid crystal display (LCD) with touch panel function; however, the operation panel 27 is not limited to this. For example, the operation panel 27 can be composed of an organic EL display with touch panel function. Furthermore, in addition to or instead of this, the operation panel 27 can be provided with an operation unit, such as hardware keys, and a display unit, such as a lamp. Incidentally, the operation panel 27 is not limited to this configuration, and can be configured in any other way as long as the operation panel 27 can display thereon an image and accept an operation according to the image.

The external connection I/F 28 is an interface for connecting to a peripheral device such as an IC card reader.

Figure 2:
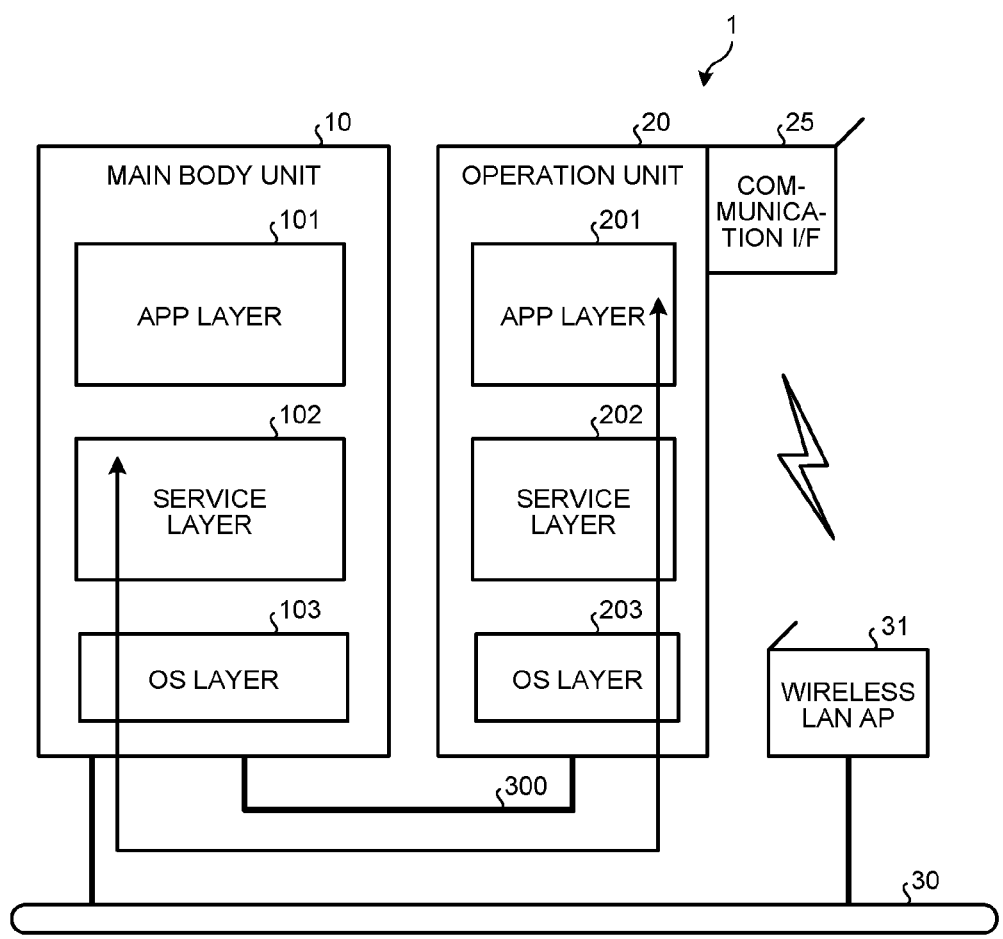
FIG. 2 is a schematic diagram showing an example of a software configuration of the MFP according to the embodiment.

Subsequently, a software configuration of the MFP 1 is explained. FIG. 2 is a schematic diagram showing an example of the software configuration of the MFP. As shown in FIG. 2, the main body unit 10 has an app layer 101, a service layer 102, and an OS layer 103. Entities of the app layer 101, the service layer 102, and the OS layer 103 are software stored in storage such as the ROM 12 or the HDD 14. The CPU 11 executes the software, thereby various functions are provided.

The software of the app layer 101 is software for operating a hardware resource thereby providing a given function, and is referred to as application software (in the following description, may be referred to simply as "app"). Examples of apps include a copy app for providing copy function, a scanner app for providing scanner function, a fax app for providing fax function, a printer app for providing printer function, etc.

The software of the service layer 102 is software that lies between the app layer 101 and the OS layer 103 and is for providing an app with an interface for using a hardware resource that the main body unit 10 includes. More specifically, the software of the service layer 102 is software for providing a function of accepting an operation request to a hardware resource and mediating the operation request. Possible operation requests accepted by the service layer 102 include a request to the scanner for reading, a request to the printer for printing, etc.

Incidentally, the interface function provided by the service layer 102 can be provided not only to the app layer 101 of the main body unit 10 but also to an app layer 201 of the operation unit 20. That is, the app layer 201 (an app) of the operation unit 20 can also realize a function using a hardware resource (for example, the engine unit 17) of the main body unit 10 via the interface function of the service layer 102.

The software of the OS layer 103 is basic software (an operating system) for providing a basic function of controlling hardware resources that the main body unit 10 includes. The software of the service layer 102 converts a request for use of a hardware resource from an app into a command that the OS layer 103 can interpret, and passes the command to the OS layer 103. Then, the software of the OS layer 103 executes the command, thereby the hardware resource operates in accordance with the request from the app.

Likewise, the operation unit 20 has the app layer 201, a service layer 202, and an OS layer 203. The hierarchical structure of the app layer 201, the service layer 202, and the OS layer 203 that the operation unit 20 has is the same as the main body unit 10 side. However, functions provided by apps of the app layer 201 and types of operation requests that the service layer 202 can accept are different from the main body unit 10 side. Some apps of the app layer 201 can be software for operating a hardware resource that the operation unit 20 includes, thereby providing a given function; however, apps of the app layer 201 are mostly software for providing user interface (UI) functions for the operations or displays pertaining to the functions that the main body unit 10 has (the copy function, the scanner function, the fax function, and the printer function).

The apps of the app layer 201 on the operation unit 20 side include a printer app for providing a UI function for performing the operation or display pertaining to the printer function, a copy app for providing a UI function for performing the operation or display pertaining to the copy function, a fax app for providing a UI function for performing the operation or display pertaining to the fax function, etc.; however, the apps of the app layer 201 are not limited to these.

Incidentally, in the present embodiment, to maintain the independence of the functions, the software of the OS layer 103 on the main body unit 10 side and the software of the OS layer 203 on the operation unit 20 side are separate software that are independent of each other. That is, the main body unit 10 and the operation unit 20 operate independently of each other on separate operating systems. For example, Linux™ can be used as the software (a second operating system) of the OS layer 103 on the main body unit 10 side, and Android™ can be used as the software (a first operating system) of the OS layer 203 on the operation unit 20 side. Furthermore, both the main body unit 10 and the operation unit 20 can also use the same type of OS; for example, they can both use Android. That is, the first and second operating systems can be different OSs, or can be the same OS.

As described above, in the MFP 1 according to the present embodiment, the main body unit 10 and the operation unit 20 operate on separate operating systems, so communication between the main body unit 10 and the operation unit 20 is performed not as inter-process communication in a common device but as communication between different devices. The operation of transmitting information (content of an instruction from a user) accepted by the operation unit 20 to the main body unit 10 (command communication), the operation of the main body unit 10 notifying the operation unit 20 of an event, etc. fall under this. Here, the operation unit 20 performs command communication with the main body unit 10, thereby can use a function of the main body unit 10. Examples of events notified to the operation unit 20 by the main body unit 10 include the operation executing state of the main body unit 10, contents set on the main body unit 10 side, etc.

Furthermore, in the present embodiment, electric power to the operation unit 20 is supplied from the main body unit 10 via the communication path 300; therefore, the power control of the operation unit 20 can be performed separately from (independently of) the power control of the main body unit 10.

Incidentally, in this example, the main body unit 10 and the operation unit 20 are electrically and physically connected via the communication path 300; however, the connection between the main body unit 10 and the operation unit 20 is not limited to this, and the operation unit 20 can be configured to be removable from the main body unit 10. In this case, the main body unit 10 and the operation unit 20 are both provided with a near field communication unit, such as an infrared communication unit, a radio frequency (RF) communication unit, or a Bluetooth™ communication unit. Or, the main body unit 10 and the operation unit 20 can be provided with a wireless LAN communication function, such as Wi-Fi™, so that they can communicate with each other via a wireless LAN access point (a wireless LAN AP) 31 and the network 30 as shown in FIG. 2. LAN is an abbreviation for "Local Area Network". In the case where the operation unit 20 is removable from the main body unit 10, the operation unit 20 accumulates electric power supplied from the main body unit 10 via the communication path 300 in a secondary battery, and, when removed from the main body unit 10, operates using the electric power accumulated in the secondary battery and performs communication with the main body unit 10.

Figure 3:
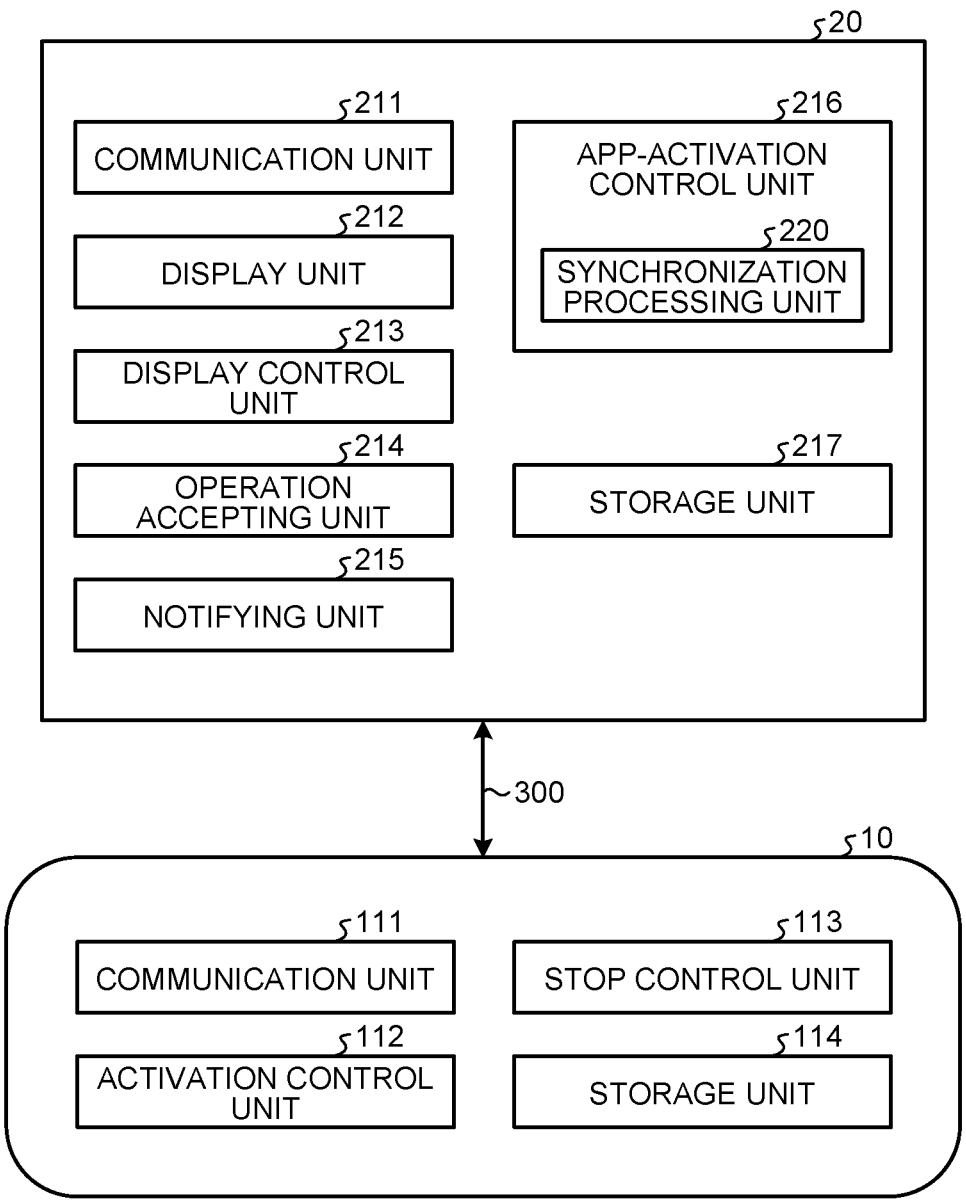
FIG. 3 is a diagram showing an example of a functional configuration of the MFP according to the embodiment.

Subsequently, a functional configuration of the MFP 1 according to the present embodiment is explained with FIG. 3. FIG. 3 is a diagram showing an example of the functional configuration of the MFP.

First, functions of the main body unit 10 side if the MFP 1 are explained. As shown in FIG. 3, the main body unit 10 includes a communication unit 111, an activation control unit 112, a stop control unit 113, and a storage unit 114 that are functions (modules) realized by the CPU 11 executing a program. Some of the above-mentioned units can be software (programs) that the CPU 11 reads out from the ROM 12 or the HDD 14 and executes, thereby the corresponding unit is loaded onto the RAM 13 and generated on the RAM 13. Furthermore, some or all of the above-mentioned units can be replaced with hardware circuitry such as a processor that performs arithmetic processing.

The communication unit 111 is realized by the CPU 11 executing a command read out from the ROM 12. The communication unit 111 is connected to the operation unit 20 via the dedicated communication path 300, and transmits/receives data to/from the operation unit 20. For example, the communication unit 111 receives various operation inputs accepted by the operation unit 20, and passes each operation input received to a corresponding unit. Furthermore, the communication unit 111 transmits data to display a variety of information (for example, information according to an accepted input, information that indicates the operating status of the MFP 1, information that indicates the settings, etc.) on the operation unit 20.

Moreover, the communication unit 111 transmits/receives data to/from an external device (such as a client PC) through the communication I/F 15 via the network 30, and passes the data to a corresponding unit. For example, the communication unit 111 receives an instruction or data to realize a function from an external device, and passes the received instruction or data to a corresponding unit.

The activation control unit 112 is realized by the CPU 11 executing a command read out from the ROM 12. Before a first application to be run on the operation unit 20 that corresponds to an input accepted by an operation accepting unit 214 is activated under the control of a synchronization processing unit 220 of an app-activation control unit 216 of the operation unit 20 to be described later, the activation control unit 112 performs control of synchronizing a third application running on the second operating system of the main body unit 10 with a second application running on the first operating system of the operation unit 20.

Specifically, when the first application to be activated on the operation unit 20 that corresponds to the input accepted by the operation accepting unit 214 is, for example, a "browser" app, the activation control unit 112 first accepts a request for activation of a home app (a third application) from the synchronization processing unit 220 of the app-activation control unit 216, and activates the home app on the main body unit 10. Then, after the home app has been activated, the activation control unit 112 performs control of transmitting a home-app activation completion notification, which is a reply to the home-app activation request, to the synchronization processing unit 220 of the app-activation control unit 216. That is, the activation control unit 112 activates the home app (the third application) under the control of the synchronization processing unit 220 of the app-activation control unit 216 of the operation unit 20, thereby performing control of synchronizing the home app (the third application) of the main body unit 10 with a home app (the second application) of the operation unit 20. Accordingly, the process of synchronizing the home app of the main body unit 10 with the home app of the operation unit 20 is performed. Incidentally, the home app is a third application (a home app) of the main body unit 10 that corresponds to a second application (a home app) that activates an initial screen of the operation unit 20 to call an operation accepting screen for using multiple functions.

Furthermore, when the first application to be activated on the operation unit 20 is, for example, a "copy" app, the activation control unit 112 first accepts a request for activation of a home app (a third application) from the synchronization processing unit 220 of the app-activation control unit 216, and activates the home app on the main body unit 10. Then, after the home app has been activated, the activation control unit 112 performs control of transmitting a home-app activation completion notification, which is a reply to the home-app activation request, to the synchronization processing unit 220 of the app-activation control unit 216. Then, the activation control unit 112 accepts a request for activation of a copy app (a first application) from the app-activation control unit 216, and activates the copy app (the first application) on the main body unit 10. Then, after the copy app has been activated, the activation control unit 112 performs control of transmitting a copy-app activation completion notification, which is a reply to the copy-app activation request, to the app-activation control unit 216.

The stop control unit 113 is realized by the CPU 11 executing a command read out from the ROM 12. When the stop control unit 113 has accepted an app stop notification, which informs of the stop of a job of an application, from the app-activation control unit 216 of the operation unit 20, the stop control unit 113 performs control of suspending a job of a currently active application on the second operating system of the main body unit 10. Specifically, when the stop control unit 113 has accepted an app stop notification, which informs of the stop of a job of an application, from the app-activation control unit 216 of the operation unit 20, the stop control unit 113 performs control of checking a currently active application on the second operating system of the main body unit 10 and suspending a job of the currently active application, and then notifying an application 221 of the operation unit 20 of an app suspension completion notification which informs that the job of the application has been suspended.

More specifically, when a currently active application 121 on the main body unit 10 is, for example, a "copy" app, the stop control unit 113 transmits a job suspension request to the copy app, and accepts a copy-app suspension completion notification from the application 121, and then notifies the copy app of the operation unit 20 of the copy-app suspension completion notification which informs that the job of the copy app has been suspended.

Furthermore, when a currently active application on the main body unit 10 is, for example, a "home" app, the stop control unit 113 transmits a job suspension request to the home app; however, as the home app does not have a job to suspend or stop, the home app does not perform any process and therefore does not sends a reply, so the stop control unit 113 does not perform any process as well. That is, when the currently active application is a home app, the home app does not send the stop control unit 113 a reply to the job suspension request, so the stop control unit 113 only transmits the job suspension request to the home app.

The storage unit 114 corresponds to the ROM 12 or the HDD 14. The storage unit 114 stores therein various data. The storage unit 114 stores therein, for example, various applications to be activated on the main body unit 10. The applications stored in the storage unit 114 include, for example, a legacy copy app, a legacy scanner app, a legacy fax app, a legacy printer app, a home app, etc.

Furthermore, the storage unit 114 stores therein identification information (model, a machine number, an ID, etc.) of the MFP 1.

Subsequently, functions of the operation unit 20 side of the MFP 1 are explained. As shown in FIG. 3, the operation unit 20 includes a communication unit 211, a display unit 212, a display control unit 213, the operation accepting unit 214, a notifying unit 215, the app-activation control unit 216, and a storage unit 217 that are functions (modules) realized by the CPU 21 executing a program. The app-activation control unit 216 includes the synchronization processing unit 220. Some of the above-mentioned units can be software (programs) that the CPU 21 reads out from the ROM 22 or the flash memory 24 and executes, thereby the corresponding unit is loaded on the RAM 23 and generated on the RAM 23. Furthermore, some of the above-mentioned units can be replaced with hardware circuitry such as a processor that performs arithmetic processing.

The communication unit 211 is realized by the CPU 21 executing a command read out from the ROM 22. The communication unit 211 is connected to the main body unit 10 via the dedicated communication path 300, and transmits/receives data to/from the main body unit 10. For example, the communication unit 211 transmits a request for activation of a home app to the activation control unit 112 of the main body unit 10. Then, the communication unit 211 receives a home-app activation completion notification, which is a reply to the home-app activation request.

Furthermore, the communication unit 211 transmits a request for activation of, for example, a copy app to be activated on the operation unit 20 that has been accepted by the operation accepting unit 214 to the activation control unit 112 of the main body unit 10. Then, the communication unit 211 receives copy-app activation completion notification, which is a reply to the copy-app activation request.

Moreover, the communication unit 211 transmits, for example, various inputs accepted by the operation unit 20 to the main body unit 10. Furthermore, the communication unit 211 receives, for example, data to display a variety of information (for example, information according to an accepted input, information that indicates the operating status of the MFP 1, information that indicates the settings, etc.) on the operation unit 20, and passes the received data to a corresponding unit.

Moreover, the communication unit 211 transmits/receives data to/from an external device (such as a client PC) through the communication I/F 25 via the network 30, and passes the data to a corresponding unit. Specifically, the communication unit 211 receives an instruction or data to realize a function from an external device, and passes the received instruction or data to a corresponding unit.

The display unit 212 corresponds to the display screen of the operation panel 27. The display unit 212 displays thereon, for example, display information (a screen) for providing information to a user under the control of the display control unit 213. Furthermore, the display unit 212 displays thereon, for example, an always-displayed screen for using a specific function.

Moreover, the display unit 212 displays thereon, for example, an operation accepting screen (a user interface (UI) screen) of an application activated by the app-activation control unit 216 to be described later. Furthermore, the display unit 212 displays thereon, for example, a home screen.

The display control unit 213 is realized by the CPU 21 executing a command read out from the ROM 22. The display control unit 213 performs control of displaying, for example, display information (a screen) for providing information to a user on the display unit 212.

Furthermore, the display control unit 213 performs control of displaying, for example, an always-displayed screen for using a specific function on the display unit 212. That is, the display control unit 213 performs control of displaying multiple function keys (software keys) always displayed in a banner area of the display unit 212. The function keys correspond to applications to be activated on the first operating system of the operation unit 20, respectively, on a one-to-one basis. That is, when a screen of a function key on the display unit 212 has been pressed, an application identified by the function key is activated. Furthermore, the function keys include a STOP key that accepts an operation of stopping an application. That is, when the STOP key, which is one of the function keys on the display unit 212, has been pressed, a job of an application is suspended, and an operation accepting screen (a UI screen) of a stop screen of the application is displayed.

Moreover, the display control unit 213 performs control of displaying an operation accepting screen (a UI screen) of an application activated by the app-activation control unit 216 on the display unit 212.

Specifically, when the application activated by the app-activation control unit 216 to be described later is, for example, a "copy" app, the app-activation control unit 216 performs a process of activating the "copy" app, and the display control unit 213 performs control of displaying an operation accepting screen of the "copy" app, such as that shown in FIG. 6, on the display unit 212. That is, when the app-activation control unit 216 has activated the "copy" app on the operation unit 20, the display control unit 213 performs control of displaying the operation accepting screen of the "copy" app on the display unit 212.

Figure 5:
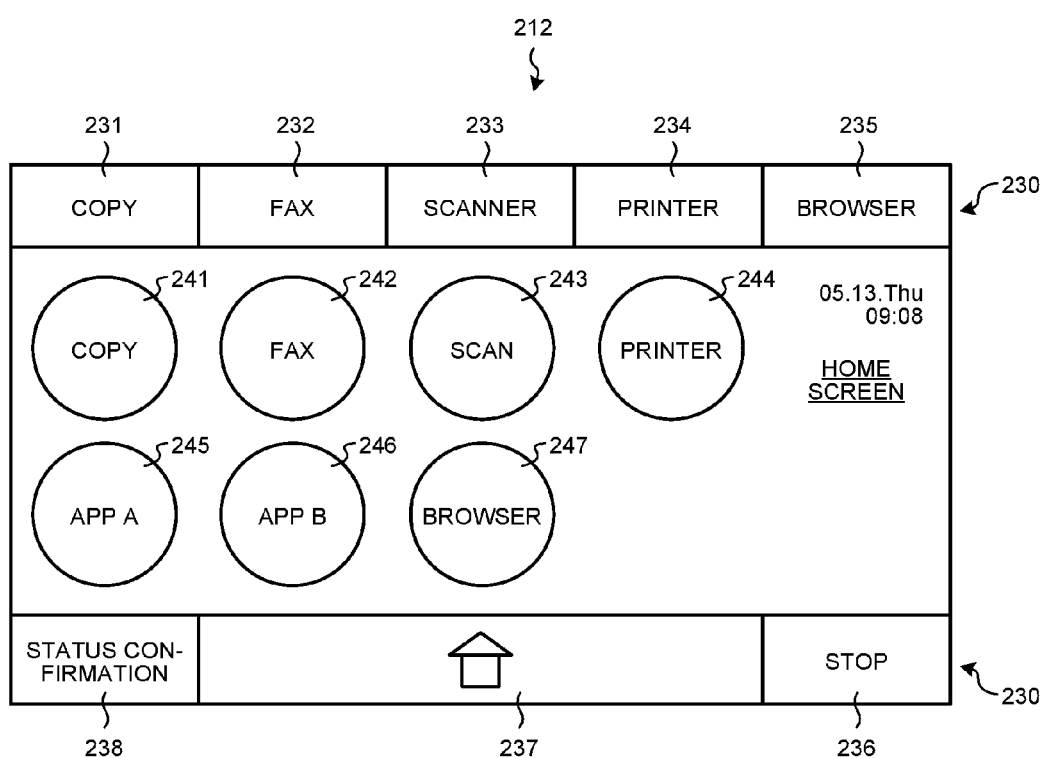
FIG. 5 is a diagram showing an example of a screen displayed on a display unit.

Furthermore, the display control unit 213 performs control of displaying a home screen, such as that shown in FIG. 5, on the display unit 212 of the operation panel 27. In the present embodiment, control of displaying, for example, icons corresponding to apps installed on the app layer 201 of the operation unit 20 on the home screen is performed.

Figure 7:
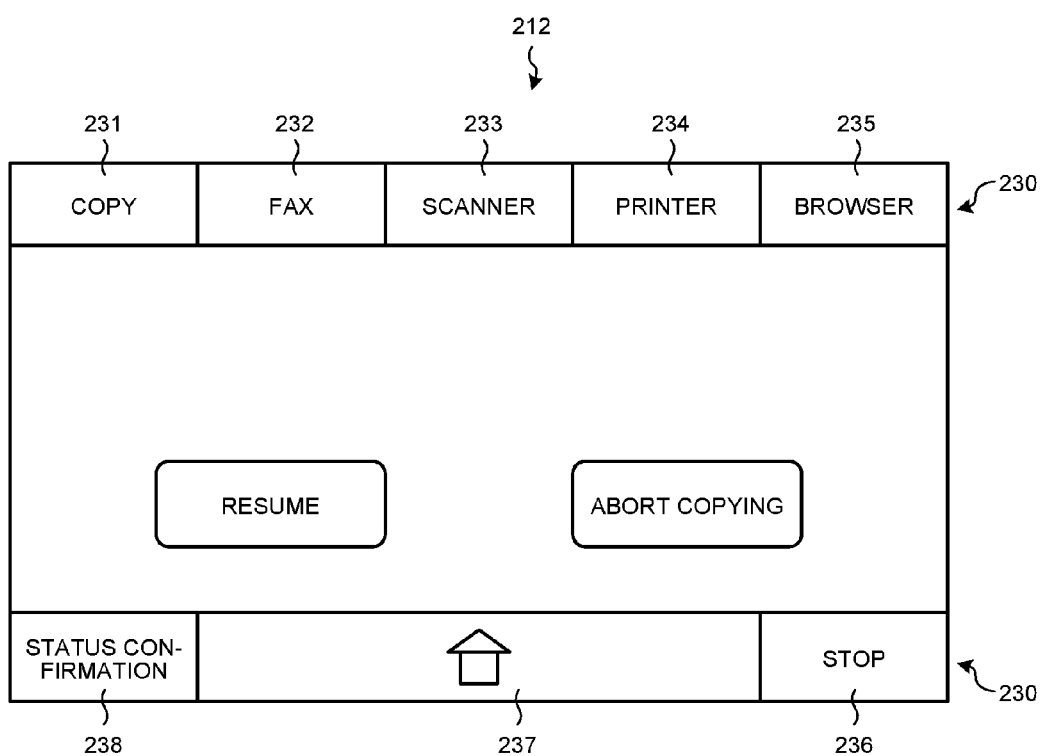
FIG. 7 is a diagram showing an example of a screen displayed on the display unit.
Figure 8:
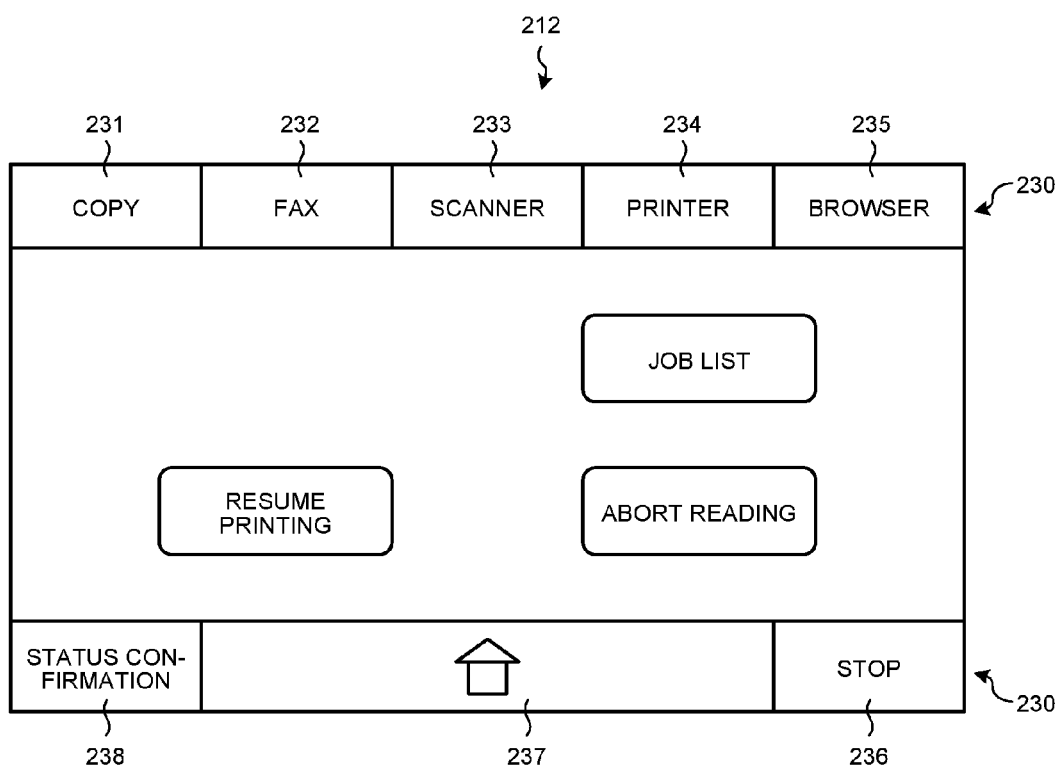
FIG. 8 is a diagram showing an example of a screen displayed on the display unit.

Moreover, for example, when a STOP key 236 in a banner area 230 has been pressed, the display control unit 213 performs control of displaying a stop screen, such as those shown in FIGS. 7 and 8, on the display unit 212 of the operation panel 27.

The operation accepting unit 214 is realized by the CPU 21 executing a command read out from the ROM 22. The operation accepting unit 214 accepts various inputs. The operation accepting unit 214 accepts, for example, an operation input according to an operation accepting screen displayed on the display unit 212 of the operation unit 20. Specifically, the operation accepting unit 214 accepts an input made by a user's touch operation on the screen of the operation panel 27 with touch panel function (the face of the display unit 212 on which an image is displayed). That is, in a state where an operation accepting screen of an app on the operation unit 20 is displayed, the operation accepting unit 214 accepts an operation input to any icon on which a touch operation has been performed. Then, the operation accepting unit 214 notifies of a process corresponding to the accepted operation through the notifying unit 215.

Furthermore, when an always-displayed screen (function key (a software key)) for using a specific function on the display unit 212 has been pressed, the operation accepting unit 214 accepts activation of a first application running on the first operating system for using the specific function associated with the screen (the function key (the software key)). After that, the operation accepting unit 214 notifies the app-activation control unit 216 of the accepted activation of the first application through the notifying unit 215. Specifically, for example, when a screen of a function key associated with a copy app (a COPY key 231, see FIG. 5) has been pressed, the operation accepting unit 214 accepts activation of the copy app. After that, the operation accepting unit 214 notifies the app-activation control unit 216 of the activation of the copy app through the notifying unit 215.

Furthermore, when the STOP key 236 (see FIG. 5) for an always-displayed screen (function key) for using a specific on the display unit 212 has been pressed, the operation accepting unit 214 accepts stop of an application. After that, the operation accepting unit 214 transmits an app stop request, which informs of suspension of a job of the application, to the stop control unit 113 of the main body unit 10 through the notifying unit 215.

The notifying unit 215 is realized by the CPU 21 executing a command read out from the ROM 22. The notifying unit 215 notifies of a process corresponding to an operation accepted by the operation accepting unit 214 of the operation unit 20.

For example, the notifying unit 215 notifies the app-activation control unit 216 of activation of a first application accepted by the operation accepting unit 214 of the operation unit 20.

Furthermore, for example, the notifying unit 215 transmits an app stop notification, which informs of suspension of a job of an application accepted by the operation accepting unit 214 of the operation unit 20, to the stop control unit 113 of the main body unit 10.

The app-activation control unit 216 includes the synchronization processing unit 220. The app-activation control unit 216 and the synchronization processing unit 220 are realized by the CPU 21 executing a command read out from the ROM 22. First, the synchronization processing unit 220 is explained below.

The synchronization processing unit 220 performs a process of synchronizing a third application running on the second operating system of the main body unit 10 with a second application running on the first operating system of the operation unit 20. Specifically, the synchronization processing unit 220 performs a process of synchronizing a home application (a second application), which activates the home screen (the initial screen) of the operation unit 20 to call the operation accepting screen (a UI screen) for using multiple applications, and a home application (a third application) of the main body unit 10 corresponding to the home application of the operation unit 20. That is, the second application is a home application of the operation unit 20, and the third application is a home application of the main body unit 10 corresponding to the home application of the operation unit 20.

Furthermore, when a specific application is activated, the synchronization processing unit 220 performs a process of synchronizing the second application (the home app) of the operation unit 20 with the third application (the home app) of the main body unit 10. The specific application here is a new application added to the operation unit 20. That is, when a new application added to the operation unit 20 is activated, the synchronization processing unit 220 performs the above-described synchronization process.

Furthermore, the specific application is an application that does not use a function of the main body unit 10. That is, when an application of the operation unit 20 does not use any function (application) of the main body unit 10, the synchronization processing unit 220 performs the above-described synchronization process. The application that does not use a function (an application) of the main body unit 10 is, for example, either a browser app or a gallery app; however, such applications are not limited to these two, and can include any other apps.

Next, the app-activation control unit 216 is explained. After the synchronization processing unit 220 has performed the process of synchronizing the third application (the home app) of the main body unit 10 with the second application (the home app) of the operation unit 20, the app-activation control unit 216 performs control of activating a first application to be run on the operation unit 20 that corresponds to an input accepted by the operation accepting unit 214.

Furthermore, the app-activation control unit 216 performs control of, with respect to each application included in first applications to be activated on the operation unit 20, referring to (analyzing) code-including-app correspondence information (an xml code included in the application) associated with an application to be activated on the main body unit 10 and transmitting an app activation request in which an application to be activated on the main body unit 10 that corresponds to the application to be activated on the operation unit 20 is specified to the main body unit 10.

For example, when the first application is a copy app, code-including-app correspondence information (an xml code) that is "Copy" is described in the copy app as an xml code. The app-activation control unit 216 refers to (analyzes) the xml code, and, if "Copy" is described, determines that it is information which specifies a "copy" app of the main body unit 10 and transmits an app activation request in which the "copy" app of the main body unit 10 is specified to the main body unit 10. Furthermore, for example, when the first application is a scanner app, code-including-app correspondence information (an xml code) that is "Scan" is described in the scanner app as an xml code. The app-activation control unit 216 refers to (analyzes) the xml code, and, if "Scan" is described, determines that it is information which specifies a "scanner" app of the main body unit 10 and transmits an app activation request in which the "scanner" app of the main body unit 10 is specified to the main body unit 10. Moreover, for example, when the first application is a fax app, code-including-app correspondence information (an xml code) that is "Fax" is described in the fax app as an xml code. The app-activation control unit 216 refers to (analyzes) the xml code, and, if "Fax" is described, determines that it is information which specifies a "fax" app of the main body unit 10 and transmits an app activation request in which the "fax" app of the main body unit 10 is specified to the main body unit 10. Furthermore, for example, when the first application is a home app, code-including-app correspondence information (an xml code) that is "Home" is described in the home app as an xml code. The app-activation control unit 216 refers to (analyzes) the xml code, and, if "Home" is described, determines that it is information which specifies a "home" app of the main body unit 10 and transmits an app activation request in which the "home" app of the main body unit 10 is specified to the main body unit 10.

Moreover, for example, when the first application is a browser app, a function of the main body unit 10 is not used, so no xml code (no code-including-app correspondence information) is described in the browser app. The app-activation control unit 216 refers to (analyzes) an xml code of the browser app, and, if no xml code is described, determines that it is information which specifies the "home" of the main body unit 10 and transmits an app activation request in which the "home" of the main body unit 10 is specified to the main body unit 10. That is, when no xml code is described in an app, the app-activation control unit 216 always determines that it is information which specifies the "home" of the main body unit 10 and transmits an app activation request in which the "home" of the main body unit 10 is specified to the main body unit 10.

In this way, when the operation accepting unit 214 has accepted a first application to be activated on the operation unit 20, the app-activation control unit 216 refers to (analyzes) code-including-app correspondence information (an xml code) in the app, and transmits an app activation request in which an application to be activated on the main body unit 10 is specified to the main body unit 10.

Furthermore, the app-activation control unit 216 can be configured to perform control of, with respect to each application that has been stored in the storage unit 217 and is to be activated on the operation unit 20, referring to stored-app correspondence information associated with an application to be activated on the main body unit 10 and transmitting an app activation request in which an application to be activated on the main body unit 10 that corresponds to the application to be activated on the operation unit 20 is specified to the main body unit 10. That is, instead of referring to (analyzing) code-including-app correspondence information (an xml code included in the application) and specifying an application to be activated on the main body unit 10, as described above, the app-activation control unit 216 can directly refers to stored-app correspondence information stored in the storage unit 217 in advance and transmit an app activation request in which the application to be activated on the main body unit 10 is specified to the main body unit 10.

Here, the stored-app correspondence information is explained with FIG. 4. FIG. 4 is a diagram illustrating an example of stored-app correspondence information. As shown in FIG. 4, the stored-app correspondence information is information that associates each application to be activated on the operation unit 20 with an application to be activated on the main body unit 10.

For example, the "copy" app of the operation unit 20 is associated with the "copy" app of the main body unit 10. Furthermore, for example, the "scanner" app of the operation unit 20 is associated with the "scanner" app of the main body unit 10. Moreover, for example, the "fax" app of the operation unit 20 is associated with the "fax" app of the main body unit 10. Furthermore, for example, the "browser" app of the operation unit 20 is associated with the "home" app of the main body unit 10. Moreover, for example, the "home" app of the operation unit 20 is associated with the "home" app of the main body unit 10. In this way, the stored-app correspondence information is information that associates an app of the operation unit 20 with an app of the main body unit 10. Therefore, the app-activation control unit 216 can directly refer to stored-app correspondence information like that shown in FIG. 4, which associates each application to be activated on the operation unit 20 with an application to be activated on the main body unit 10, and transmit an app activation request in which an application to be activated on the main body unit 10 is specified.

To return to the explanation of functions of the operation unit 20 (FIG. 3), the storage unit 217 corresponds to the ROM 22 or the flash memory 24. The storage unit 217 stores therein stored-app correspondence information that associates each application to be activated on the operation unit 20 with an application to be activated on the main body unit 10. Incidentally, the stored-app correspondence information is updated and stored in the storage unit 217 when a new app has been added to the operation unit 20 or when the correspondence information has been changed. Incidentally, the stored-app correspondence information is as explained above with FIG. 4.

The storage unit 217 stores therein various data. The storage unit 217 stores therein, for example, various applications to be activated on the operation unit 20. The applications stored in the storage unit 217 include, for example, an easy-to-use Copy app, an easy-to-use Scanner app, an easy-to-use Fax app, a Printer app, a Home app, etc.

Subsequently, a screen displayed on the display unit 212 of the operation unit 20 is explained with FIGS. 5 to 8. FIGS. 5 to 8 are diagrams showing examples of a screen displayed on the display unit.

FIG. 5 shows an example of the initial screen (the home screen) of the operation unit 20 to call the operation accepting screen (the UI screen) for using multiple functions. As shown in FIG. 5, multiple always-displayed function keys (software keys) 231 to 238 are displayed in the banner area 230. In the upper banner area 230, the COPY key 231, a FAX key 232, a SCANNER key 233, a PRINTER key 234, and a BROWSER key 235 are arranged; the function keys 231 to 235 are a software key to directly activate a corresponding app. In the lower banner area 230, the STOP key 236, a HOME key 237 for displaying the home screen, and a STATUS CONFIRMATION key 238 for checking the status of the MFP 1 are displayed. These are all function keys (software keys).

As the example shown in FIG. 5 is an example of the home screen, icons 241 to 247 for using the multiple functions of the operation unit 20 are displayed in the central part of the display unit 212. That is, a COPY icon 241, a FAX icon 242, a SCAN icon 243, a PRINTER icon 244, an APP A icon 245, an APP B icon 246, and a BROWSER icon 247 are displayed so as to activate respective apps. When any of these icons 241 to 247 has been pressed, an app corresponding to the icon is activated.

Figure 6:
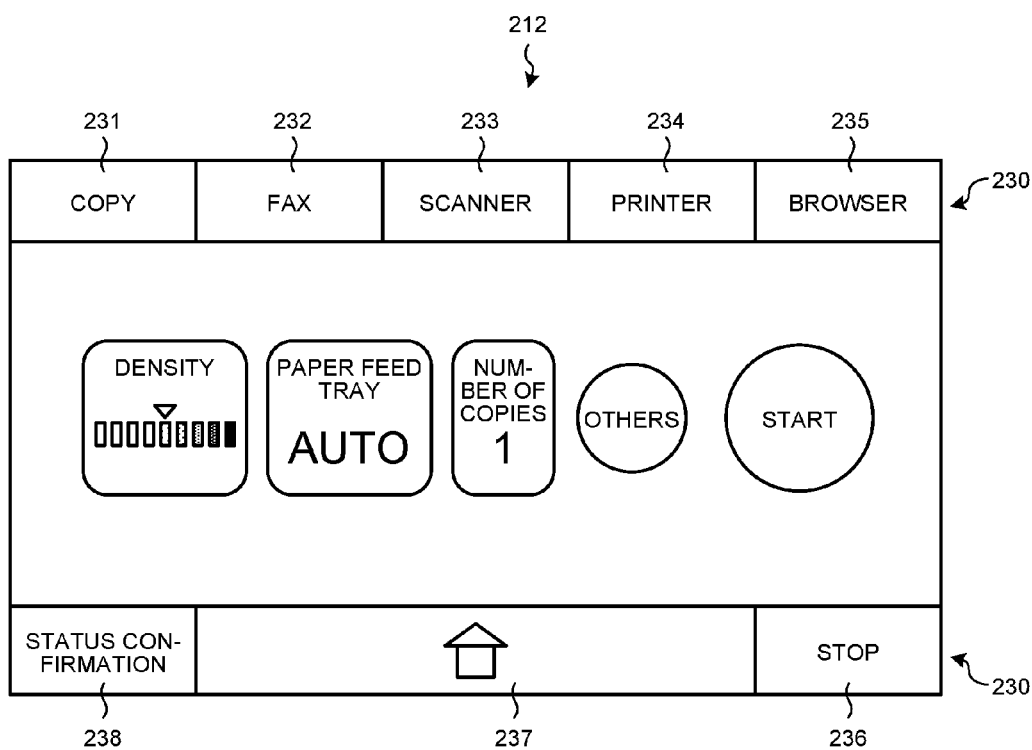
FIG. 6 is a diagram showing an example of a screen displayed on the display unit.

FIG. 6 shows an example of an operation accepting screen (a UI screen) for using the copy function that is displayed when the COPY key 231 in the banner area 230 or the COPY icon 241 on the home screen has been pressed. As shown in FIG. 6, an icon to perform the density adjustment, an icon to select a paper feed tray, an icon to select the number of copies, an icon to display other functions, and an icon to activate the copying are displayed in order from the left of the operation accepting screen. Incidentally, in FIG. 6, for example, when the FAX key 232 in the banner area 230 has been pressed, the display screen is switched to an operation accepting screen (a UI screen) for using the fax function.

FIGS. 7 and 8 show an example of a screen displayed when the STOP key 236 has been pressed. Specifically, FIG. 7 shows an example of a screen displayed when the setting of the STOP key 236 is to stop a process of a currently-displayed application; FIG. 8 shows an example of a screen displayed when the setting of the STOP key 236 is to stop all processing of multiple apps that are currently being processed.

The example in FIG. 7 is based on the assumption that copy processing is being performed. On the operation accepting screen for using the copy function shown in FIG. 6, when the STOP key 236 in the banner area 230 has been pressed, an icon to resume a suspended copying job and an icon to abort a suspended copying job are displayed in order from the left of the operation accepting screen as shown in FIG. 7.

The example in FIG. 8 is based on the assumption that scanner processing and printer processing are being performed. As shown in FIG. 8, when the STOP key 236 in the banner area 230 has been pressed, an icon to resume a suspended printing job in the printer processing and an icon to abort a reading job in the scanner processing are displayed on the bottom left and bottom right of the operation accepting screen, respectively, and an icon to display a list of currently-processing jobs is displayed on the top right of the operation accepting screen.

Figure 9:
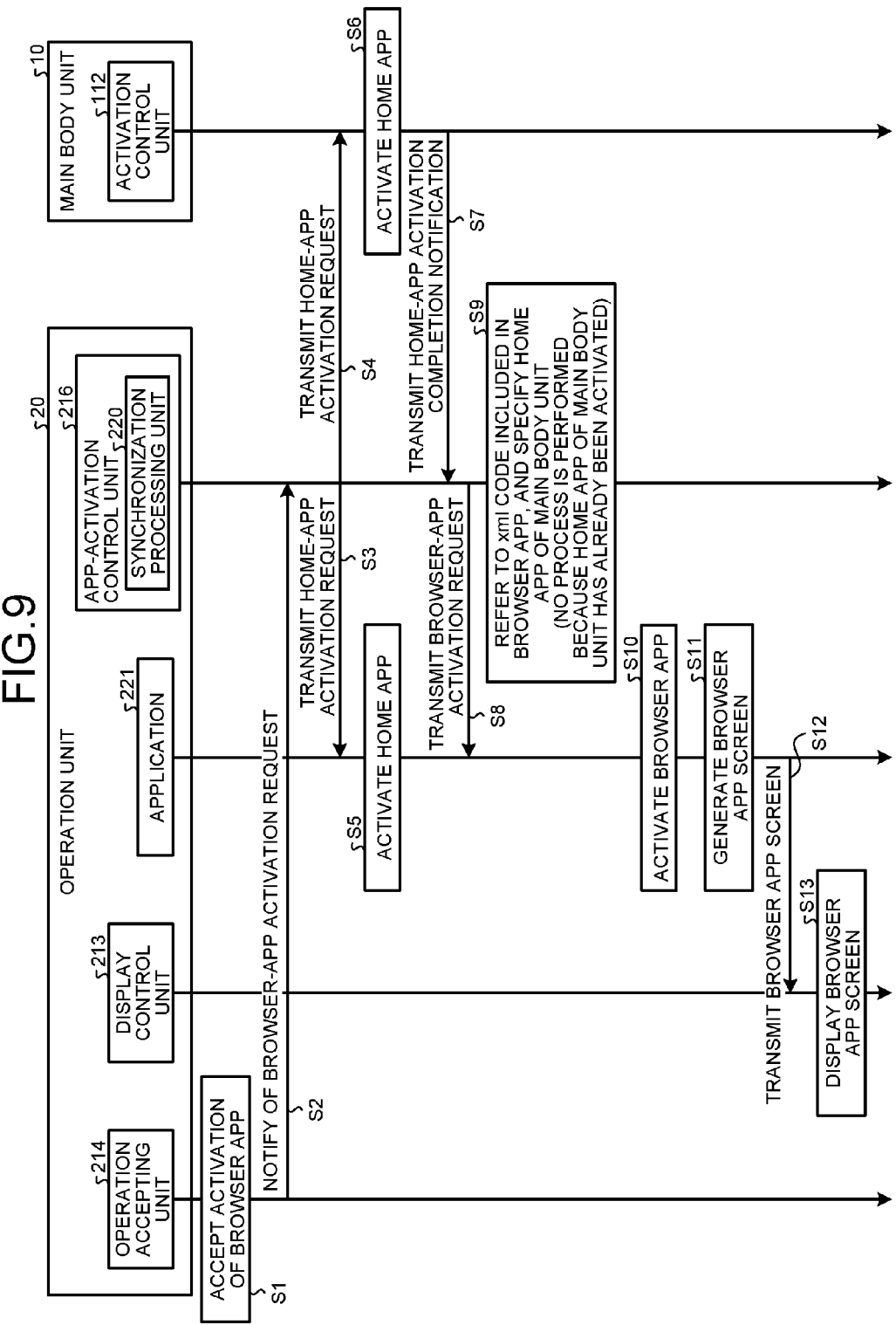
FIG. 9 is a diagram illustrating an example of the processing operation of the MFP when accepted the activation of a browser app.

Subsequently, the processing operation of the MFP 1 according to the present embodiment is explained with FIGS. 9 to 12. FIG. 9 is a diagram illustrating an example of the processing operation of the MFP when accepted the activation of a browser app. Incidentally, in the example described below, the operation accepting unit 214 accepts the activation of an application associated with pressed one of the always-displayed function keys (software keys) on the display unit 212.

The operation accepting unit 214 of the operation unit 20 accepts the activation of a browser app (Step S1). That is, the BROWSER key 235 in the banner area 230 (see FIG. 5) has been pressed, thereby the operation accepting unit 214 accepts the activation of a browser app.

Then, the operation accepting unit 214 of the operation unit 20 notifies the app-activation control unit 216 of a request for the activation of the browser app (Step S2).

Then, the synchronization processing unit 220 of the app-activation control unit 216 transmits a request for the activation of a home app to the application 221 of the operation unit 20 (Step S3), and transmits a request for the activation of a home app to the activation control unit 112 of the main body unit 10 (Step S4). The operation unit 20 activates the home app of the application 221 (Step S5).

Then, when having received the request for the activation of a home app, the activation control unit 112 of the main body unit 10 activates the home app on the main body unit 10 (Step S6), and then transmits a home-app activation completion notification to the synchronization processing unit 220 of the app-activation control unit 216 (Step S7).

Then, when having received the home-app activation completion notification from the main body unit 10, the app-activation control unit 216 transmits the request for the activation of the browser app of the application 221 of the operation unit 20 (Step S8), and refers to (analyzes) code-including-app correspondence information included in the browser app (an xml code included in the application); however, no xml code (no code-including-app correspondence information) is described in the browser app, so the app-activation control unit 216 determines that it is information which specifies the home app of the main body unit 10 (Step S9). However, the app-activation control unit 216 does not perform any process because the home app of the main body unit 10 has already activated in response to the request from the synchronization processing unit 220.

After that, the browser app of the application 221 is activated (Step S10), and the browser app generates a browser app screen (Step S11) and transmits the browser app screen to the display control unit 213 (Step S12).

The display control unit 213 displays the browser app screen on the display unit 212 (Step S13).

Figure 10:
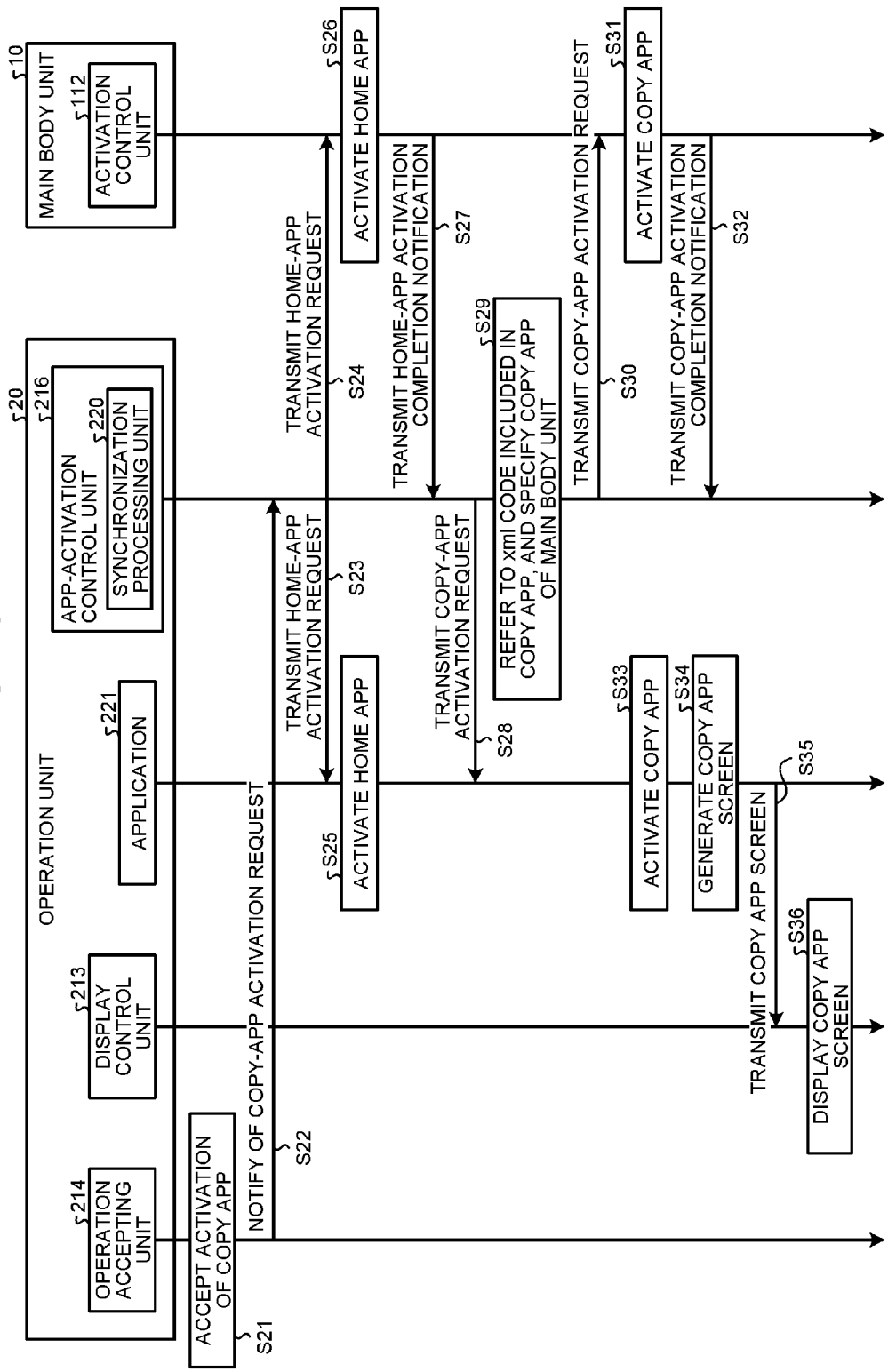
FIG. 10 is a diagram illustrating an example of the processing operation of the MFP when accepted the activation of a copy app.

FIG. 10 is a diagram illustrating an example of the processing operation of the MFP when accepted the activation of a copy app. Incidentally, in the example described below, the operation accepting unit 214 accepts the activation of an application associated with a pressed function key that is any one of the always-displayed function keys (software keys) on the display unit 212.

The operation accepting unit 214 of the operation unit 20 accepts the activation of a copy app (Step S21). That is, the COPY key 231 in the banner area 230 (see FIG. 5) has been pressed, thereby the operation accepting unit 214 accepts the activation of a copy app.

Then, the operation accepting unit 214 of the operation unit 20 notifies the app-activation control unit 216 of a request for the activation of the copy app (Step S22).

Then, the synchronization processing unit 220 of the app-activation control unit 216 transmits a home-app activation request to the application 221 of the operation unit 20 (Step S23), and transmits a home-app activation request to the activation control unit 112 of the main body unit 10 (Step S24). The operation unit 20 activates the home app of the application 221 (Step S25).

Then, when having received the request for the activation of a home app, the activation control unit 112 of the main body unit 10 activates the home app on the main body unit 10 (Step S26), and then transmits a home-app activation completion notification to the synchronization processing unit 220 of the app-activation control unit 216 (Step S27).

Then, when having received the home-app activation completion notification from the main body unit 10, the app-activation control unit 216 transmits the request for the activation of the copy app of the application 221 of the operation unit 20 (Step S28), and refers to (analyzes) code-including-app correspondence information included in the copy app (an xml code included in the application), and determines that it is information which specifies a copy app of the main body unit 10 (Step S29). Then, the app-activation control unit 216 transmits a copy-app activation request in which the copy app of the main body unit 10 corresponding to the copy app of the operation unit 20 is specified to the main body unit 10 (Step S30).

Then, when having received the copy-app activation request, the activation control unit 112 of the main body unit 10 activates the copy app on the main body unit 10 (Step S31), and then transmits a copy-app activation completion notification to the app-activation control unit 216 (Step S32).

After that, the copy app of the application 221 is activated (Step S33), and the copy app generates a copy app screen (Step S34) and transmits the copy app screen to the display control unit 213 (Step S35).

The display control unit 213 displays the copy app screen (a UI screen) on the display unit 212 (Step S36).

In this way, in the present embodiment, the operation accepting unit 214 of the operation unit 20 accepts the activation of an application associated with pressed one of the always-displayed function keys (software keys) on the display unit 212. First, the synchronization processing unit 220 causes a home app to be activated on the operation unit 20, and transmits a request for the activation of a home app of the main body unit 10 corresponding to the home app of the operation unit 20, thereby causing the home app of the main body unit 10 to be activated. By this process performed by the synchronization processing unit 220, a process of synchronizing the home app of the operation unit 20 with the home app of the main body unit 10 is performed. Then, after the synchronization processing unit 220 has performed the home-app synchronizing process, the app-activation control unit 216 causes the application 221 accepted by the operation accepting unit 214 to be activated. In the present embodiment, by causing the operation unit 20 and the main body unit 10 to perform the above-described process, an application displayed on the operation unit 20 can be synchronized with a currently active application on the main body unit 10.

Figure 11:
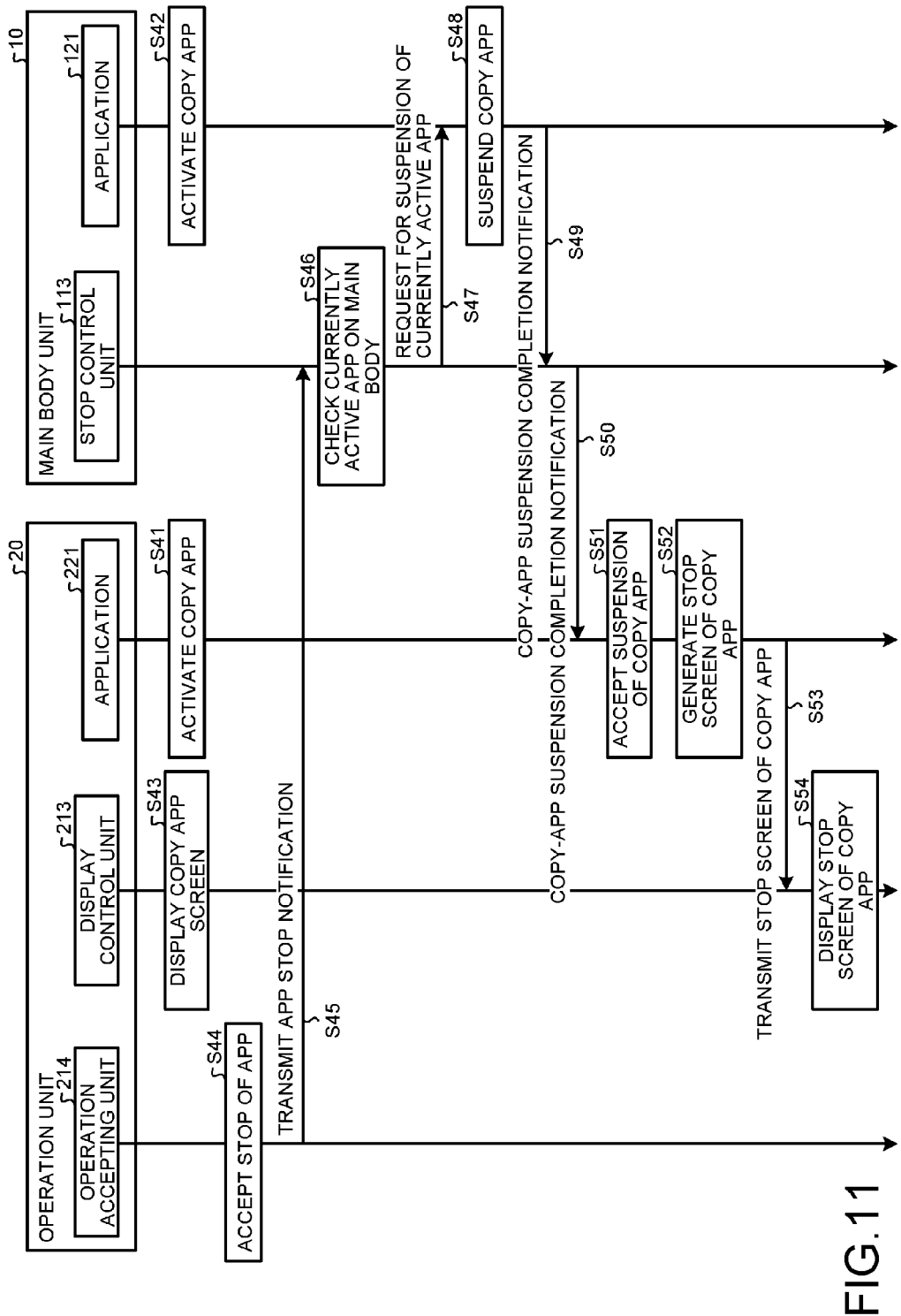
FIG. 11 is a diagram illustrating an example of the processing operation of the MFP when accepted the stop of an app.

FIG. 11 is a diagram illustrating an example of the processing operation of the MFP when accepted the stop of an app. The example shown in FIG. 11 is based on the premise that the job stop setting is set so that when the STOP key 236, which is one of the always-displayed function keys on the display unit 212, has been pressed, a job of an app displayed on the display unit 212 of the operation unit 20 is stopped. The example in FIG. 11 shows the operation when the job stop setting is set to stop a job of an app displayed on the display unit 212. First, the app-activation control unit 216 of the operation unit 20 activates a copy app of the application 221 (Step S41), and the activation control unit 112 of the main body unit 10 activates a copy app of the application 121 of the main body unit 10 corresponding to the copy app of the operation unit 20 (Step S42). Then, the display control unit 213 of the operation unit 20 displays a screen (a UI screen) of the copy app on the display unit 212 (Step S43). That is, the operation unit 20 is in a state where an operation accepting screen (a UI screen) of the copy app is being displayed on the display unit 212 thereof.

In the above-described state, the operation accepting unit 214 of the operation unit 20 accepts the stop of an app (Step S44). That is, the STOP key 236 in the banner area 230 (see FIG. 6) has been pressed, thereby the operation accepting unit 214 accepts the stop of an app.

Then, the operation accepting unit 214 of the operation unit 20 transmits an app stop notification to the stop control unit 113 of the main body unit 10 (Step S45).

Then, when having received the app stop notification, the stop control unit 113 of the main body unit 10 checks a currently active app on the main body unit 10 (Step S46). After that, the stop control unit 113 transmits an app suspension request to the currently active copy app of the application 121 (Step S47). That is, in the example shown in FIG. 11, the stop control unit 113 confirms that the currently active app on the main body unit 10 is a copy app, and transmits a job suspension request to the copy app of the application 121.

Then, when having received the suspension request, the copy app of the application 121 performs a process of suspending the job (Step S48). Then, the copy app transmits a copy-app suspension completion notification, which is a reply to the copy-app suspension request, to the stop control unit 113 (Step S49).

Then, the stop control unit 113 transmits the copy-app suspension completion notification to the copy app of the application 221 of the operation unit 20 (Step S50).

Then, the copy app of the operation unit 20 accepts the suspension completion notification (Step S51), and generates a stop screen of the copy app (Step S52) and transmits the stop screen of the copy app to the display control unit 213 (Step S53).

The display control unit 213 displays the stop screen of the copy app on the display unit 212 (Step S54).

FIG. 12 is a diagram illustrating another example of the processing operation of the MFP when accepted the stop of an app. The example shown in FIG. 12 is based on the premise that the job stop setting is set so that when the STOP key 236, which is one of the always-displayed function keys on the display unit 212, has been pressed, a job of an app displayed on the display unit 212 of the operation unit 20 is stopped. The example in FIG. 12 shows the operation when the job stop setting is set to stop a job of an app displayed on the display unit 212. First, the app-activation control unit 216 of the operation unit 20 activates a browser app of the application 221 (Step S61), and the activation control unit 112 of the main body unit 10 activates a home app of the application 121 of the main body unit 10 corresponding to the browser app of the operation unit 20 (Step S62). Then, the display control unit 213 of the operation unit 20 displays a screen of the browser app on the display unit 212 (Step S63). That is, the operation unit 20 is in a state where the screen of the browser app is being displayed on the display unit 212 thereof.

In the above-described state, the operation accepting unit 214 of the operation unit 20 accepts the stop of an app (Step S64). That is, the STOP key 236 in the banner area 230 has been pressed, thereby the operation accepting unit 214 accepts the stop of an app.

Then, the operation accepting unit 214 of the operation unit 20 transmits an app stop notification to the stop control unit 113 of the main body unit 10 (Step S65).

Then, when having received the app stop notification, the stop control unit 113 of the main body unit 10 checks a currently active app on the main body unit 10 (Step S66). After that, the stop control unit 113 transmits an app suspension request to the currently active home app of the application 121 (Step S67). That is, in the example shown in FIG. 12, the stop control unit 113 confirms that the currently active app on the main body unit 10 is a home app, and transmits a job suspension request to the home app of the application 121.

Then, the home app of the application 121 has received the job suspension request; however, the home app has no job to be suspended or stopped, so the home app does not perform any process. That is, when the currently active app on the main body unit 10 is a home app, the home app does not send a reply to the request for suspension of the currently active app to the stop control unit 113.

In this way, in the present embodiment, after the synchronization processing unit 220 has performed a process of synchronizing the home app of the operation unit 20 with the home app of the main body unit 10, the app-activation control unit 216 activates a first application accepted by the operation accepting unit 214 first. Then, the operation accepting unit 214 of the operation unit 20 accepts the stop of an app requested by pressing of the STOP key 236, which is one of the always-displayed function keys (software keys) on the display unit 212. The operation accepting unit 214 transmits an app stop notification to the main body unit 10, and the main body unit 10 checks a currently active app on the main body unit 10 and suspends an active job of the currently active app on the main body unit 10. After that, the main body unit 10 notifies the operation unit 20 of the app that has been subjected to job suspension, thereby the operation unit 20 displays thereon a stop screen of an app of the operation unit 20 corresponding to the notified app of the main body unit 10 that has been subjected to job suspension. Accordingly, in the present embodiment, an application displayed on the operation unit is synchronized with a currently active application on the main body unit; therefore, it is possible to display a stop screen to stop an app displayed on the display unit 212 of the operation unit 20.

As described above, according to the present embodiment, it is possible to achieve an advantageous effect that when the operation accepting unit 214 has accepted the activation of an app, first, the synchronization processing unit 220 performs a process of synchronizing a home app of the operation unit 20 with a home app of the main body unit 10 corresponding to the home app of the operation unit 20, thereby an application displayed on the operation unit can be synchronized with a currently active application on the main body unit.

The embodiment according to the present invention is described above; however, the present invention is not limited to the above-described embodiment just as it is, and can be embodied by modifying any of components in an implementation phase without departing from the scope of the invention. Furthermore, various inventions can be created by appropriate combinations of multiple components disclosed in the above-described embodiment. For example, some components can be eliminated from all the components disclosed in the embodiment. Furthermore, components across different embodiments can be combined appropriately.

Moreover, software (program) executed in the image forming apparatus 1 according to the above-described embodiment can be provided in such a manner that the software (program) is recorded on a computer-readable recording medium, such as a floppy (trademark) disk, a compact disc (CD), a compact disc-recordable (CD-R), a compact disc read only memory (CD-ROM), a digital versatile disc (DVD), an SD memory card, or a universal serial bus (USB) memory, in an installable or executable file format.

Furthermore, the software (program) executed in the image forming apparatus 1 according to the present embodiment can be provided in such a manner that the software (program) is stored on a computer connected to a network such as the Internet so that the software (program) can be downloaded via the network. Moreover, the software (program) executed in the image forming apparatus 1 according to the present embodiment can be provided or distributed via a network such as the Internet.

The software (program) executed in the image forming apparatus 1 according to the present embodiment is composed of modules including the above-described functional units; as hardware to realize these units, the CPUs (processors) 11 and 21 read out the software (programs) from the ROMs 12 and 22 and execute the software (programs), thereby respective executable codes of the programs that realize the functional units are loaded onto the RAMs 13 and 23, and the functional units are generated on the RAMs 13 and 23.

Incidentally, in the above-described embodiment, there is described an example in which the image forming apparatus 1 according to the present invention is applied to an MFP having at least any two of the following functions: copy function, printer function, scanner function, and facsimile function; however, the present invention can be applied any image forming apparatus such as a copier, a printer, a scanner device, and a facsimile apparatus.

According to the present invention, it is possible to synchronize an application displayed on the operation unit with a currently active application on the main body unit.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
a first processor configured to control a display unit and configured to implement a first operating system, the display unit being configured to display a screen, the first processor being further configured to accept an operation; and
a second processor configured to implement a second operating system, the second processor being configured to act according to an operation accepted by the first processor, wherein
the first processor being-further-configured to,
accept, when an always-displayed screen for using a specific function has been pressed, activation of a first application running on the first operating system to use the specific function associated with the screen;
perform a synchronization process of synchronizing a second application running on the first operating system and a third application running on the second operating system;
activate the first application after performing the synchronization process; and
perform control of displaying an operation accepting screen of the first application on the display unit.

2. The image forming apparatus according to claim 1, wherein, the first processor is configured to perform, when a specific application is activated, the synchronization process of synchronizing the second application and the third application.

3. The image forming apparatus according to claim 2, wherein the specific application is an application newly added to the first processor.

4. The image forming apparatus according to claim 2, wherein the specific application is an application that does not use a function of the second processor.

5. The image forming apparatus according to claim 4, wherein the application that does not use a function of the second processor is either a browser app or a gallery app.

6. The image forming apparatus according to claim 1, wherein the synchronization process is a process of synchronizing a second application that activates an initial screen of the first processor on the display unit to call the operation accepting screen for using multiple functions and a third application of the second processor that corresponds to the second application of the first processor.

7. The image forming apparatus according to claim 6, wherein
the second application is a home application that activates the initial screen of the first processor, and
the third application is a home application of the second processor that corresponds to the home application of the first processor.

8. The image forming apparatus according to claim 1, wherein
the second processor is further configured to
perform, when having received a notification of stop of an application, control of stopping a job of a currently active application on the second operating system of the second processor, and
accept, when a STOP key on an always-displayed screen for using a specific function has been pressed, stop of an application and notifies the second processor of the stop of the application,
check, when having received a notification of the stop of the application, a currently active application on the second operating system of the second processor and suspends a job of the application, and then transmits an app suspension completion notification, which informs that the job of the application has been suspended, to an application of the first processor,
the first processor is further configured to generate, when having received the app suspension completion notification, a stop screen of the application and transmit the generated stop screen to the display unit, and
the display unit is further configured to display the stop screen.

9. An image forming apparatus comprising:
a first processor configured to control a display unit and configured to implement a first operating system, the display unit being configured to display a screen, the first processor being further configured to accept an operation; and
a second processor configured to
implement a second operating system,
act according to an operation accepted by the first processor and, when notified of the stop of an application accepted by the first processor, and
control a process of checking a currently active application on the second operating system and stopping a job of the application, wherein the first processor being configured to,
accept, when an always-displayed screen for using a specific function has been pressed, activation of a first application running on the first operating system to use the specific function associated with the screen;
perform a synchronization process of synchronizing a second application running on the first operating system and a third application running on the second operating system;
activate the first application after has performing the synchronization process; and
perform control of displaying an operation accepting screen of the first application on the display unit.

10. The image forming apparatus according to claim 9, wherein the first processor is further configured to perform, when a specific application is activated, the synchronization process of synchronizing the second application and the third application.

11. The image forming apparatus according to claim 10, wherein the specific application is an application newly added to the first processor.

12. The image forming apparatus according to claim 10, wherein the specific application is an application that does not use a function of the second processor.

13. The image forming apparatus according to claim 12, wherein the application that does not use a function of the second processor is either a browser app or a gallery app.

14. The image forming apparatus according to claim 9, wherein the synchronization process is a process of synchronizing a second application that activates an initial screen of the first processor on the display unit to call the operation accepting screen for using multiple functions and a third application of the second processor that corresponds to the second application of the first processor.

15. The image forming apparatus according to claim 14, wherein
the second application is a home application that activates the initial screen of the first processor, and
the third application is a home application of the second processor that corresponds to the home application of the first processor.

16. The image forming apparatus according to claim 9, wherein
the second processor is further configured to
perform, when having received a notification of stop of an application, control of stopping a job of a currently active application on the second operating system of the second processor,
accept, when a STOP key on an always-displayed screen for using a specific function has been pressed, stop of an application and notifies the second processor of the stop of the application,
check, when having received a notification of the stop of the application, a currently active application on the second operating system of the second processor and suspends a job of the application, and
transmit an app suspension completion notification, which informs that the job of the application has been suspended, to an application of the first processor,
the first processor is further configured to generate, when having received the app suspension completion notification, a stop screen of the application and transmit the generated stop screen to the display unit, and
the display unit is further configured to display the stop screen.

17. An image forming method implemented by an image forming apparatus that includes a first processor configured to control a display unit and configured to implement a first operating system, the display unit being configured to display a screen, the first processor being further configured to accept an operation, and a second processor configured to implement a second operating system, the second processor being configured to act according to an operation accepted by the first processor, the image forming method comprising:

accepting, when an always-displayed screen for using a specific function has been pressed, activation of a first application running on the first operating system to use the specific function associated with the screen;

performing a synchronization process of synchronizing a second application running on the first operating system and a third application running on the second operating system;

activating the first application after the synchronization process has been performed; and performing control of displaying an operation accepting screen of the activated first application on the display unit.

\* \* \* \* \*